United States Patent [19]

Davis

[11] 4,318,518
[45] Mar. 9, 1982

[54] INSULATED HANGER STRAP

[76] Inventor: Lynwood A. Davis, 15034 Ida West Rd., Petersburg, Mich. 49270

[21] Appl. No.: 132,256

[22] Filed: Mar. 20, 1980

[51] Int. Cl.³ .............................................. E21F 17/02
[52] U.S. Cl. ..................................... 248/60; 248/74 B
[58] Field of Search ...................... 248/49, 58, 59, 60, 248/62, 65, 68 R, 70, 74 R, 74 A, 74 B, 74 PB; 24/16 R, 73 PB, 279; 174/40 CC

[56] References Cited

U.S. PATENT DOCUMENTS

| | | |
|---|---|---|
| 2,291,148 | 7/1942 | Carson . |
| 2,618,450 | 11/1952 | Thomas ............................ 248/74 R |
| 2,922,733 | 1/1960 | Henning ........................ 248/74 B X |
| 2,936,982 | 5/1960 | Cushenberry ..................... 248/74 B |
| 2,982,505 | 5/1961 | Shy ..................................... 248/74 B |
| 3,095,908 | 7/1963 | Plummer . |
| 3,159,708 | 12/1964 | Deal .............................. 248/74 B X |
| 3,370,815 | 2/1968 | Opperthauser . |
| 3,653,618 | 4/1972 | Kindorf . |
| 4,121,796 | 10/1978 | Forbes . |
| 4,189,807 | 2/1980 | Byerly .......................... 248/74 B X |

FOREIGN PATENT DOCUMENTS

| | | | |
|---|---|---|---|
| 692387 | 4/1965 | Italy ................................. 248/74 PB |
| 6704869 | 3/1968 | Netherlands ................... 248/74 PB |
| 1173913 | 12/1969 | United Kingdom ................. 248/62 |

*Primary Examiner*—J. Franklin Foss
*Attorney, Agent, or Firm*—Wilson, Fraser, Barker & Clemens

[57] ABSTRACT

This invention relates to insulated hanger strap, designed to support ductwork, pipes, and the like. A flexible sheet metal strip is provided with holes through which fasteners may be inserted and be secured to a supporting structure. An elastomeric strip completely covers one side of the sheet metal strip, and has flanges formed on its longitudinal edges which cover the edges of the associated sheet metal strip. Channels are formed in the flanges of the electronic strip to receive the respective metal strip edges, thus maintaining the metal strip and the elastomeric strip in attached relationship.

1 Claim, 3 Drawing Figures

INSULATED HANGER STRAP

BACKGROUND OF THE INVENTION

Flexible strips of sheet metal, known as hanger iron or hanger strap, are known in the art, for their use in suspending ductwork or pipes from a supporting structure. Uninsulated hanger iron, however, has been found to have several disadvantages. When it is used to hang metal ductwork or pipe, the metal to metal contact results in undesirable noise produced by vibration of the ductwork or pipe. When used to hang PVC or other plastic pipe, the exposed edges of the sheet metal strip can score, gouge, and eventually rupture the pipe.

U.S. Pat. No. 2,291,148, to E. J. Carson, discloses a wire pipe hanger, which has a resilient insulating material surrounding the wires at the bight portion of the wire hanger. The Carson hanger, however, is relatively rigid, and not adaptable to accommodate different sized pipes. Rather, both the wire hanger section and the resilient insulating element must be manufactured in different sizes for different size pipe.

There is accordingly, a need for a strong, flexible, insulated hanger strap, which may be easily deformed to adapt to ducts and pipes of various sizes and shapes.

SUMMARY OF THE INVENTION

The invention relates to a flexible, insulated hanger strap, comprising an elongate, perforated, sheet metal strip, nested within a coterminous, elongate, extruded strip of elastomeric insulating material. The insulating strip covers one side of the sheet metal strip, and has side flanges which extend around the edges of the sheet metal strip. The insulating strip flanges have channels respectively formed therein in facing relationship, which receive the edges of the sheet metal strip. The flanges thus extend around the sheet metal edges, and over the opposite side of the sheet metal strip to an extent. The flanges thus grip the sheet metal strip and maintain the sheet metal and insulator in attached relationship during installation and of the insulated hanger strap.

The invention thus provides a flexible, insulated hanger strap, which may be easily deformed to adapt to the size and shape of the duct or pipe to be supported. Holes formed in the metal strip permit easy nailing or bolting of the insulated hanger iron to a supporting structure.

BRIEF DESCRIPTION OF THE DRAWINGS

The above objects and advantages of the invention will become readily apparent to one skilled in the art from reading the following detailed description of an embodiment of the invention and considered in light of the accompanying drawings, in which.

DESCRIPTION OF THE PREFERRED EMBODIMENT

Figure 2:
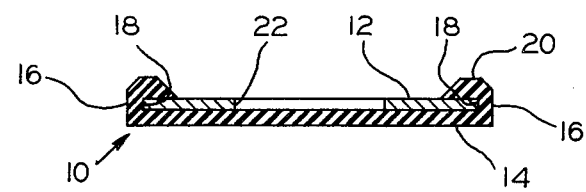
FIG. 2 is a sectional view of the insulated strap of FIG. 1, taken on the line 2—2 thereof.

As illustrated in the drawings, an insulated hanger strap, generally indicated by reference numeral 10, embodying the features of this invention comprises an elongated sheet metal strip 12, nested within a coterminous extruded strip of insulating elastomeric material 14. The elastomeric strip 14 has flanges 16 formed on each longitudinal edge thereof which project upwardly and inwardly beyond one side of the strip 14. The flanges 16 are provided with channels 18 formed therein in facing relationship, constructed and arranged to receive the respective edges of the of metal strip 12. As best seen in FIG. 2, when the metal strip 12 is inserted within the channels 18, one side or surface of the metal strip 12 is completely covered by the elastomeric strip 14. The flanges 16 cover the edges of the strip 12, and overlying portions 20 of flanges 16 extend onto the exposed side of metal strip 12, thereby gripping the metal strip 12 to maintain the elastomeric strip 14 and the metal strip 12 in attached relationship.

Figure 1:
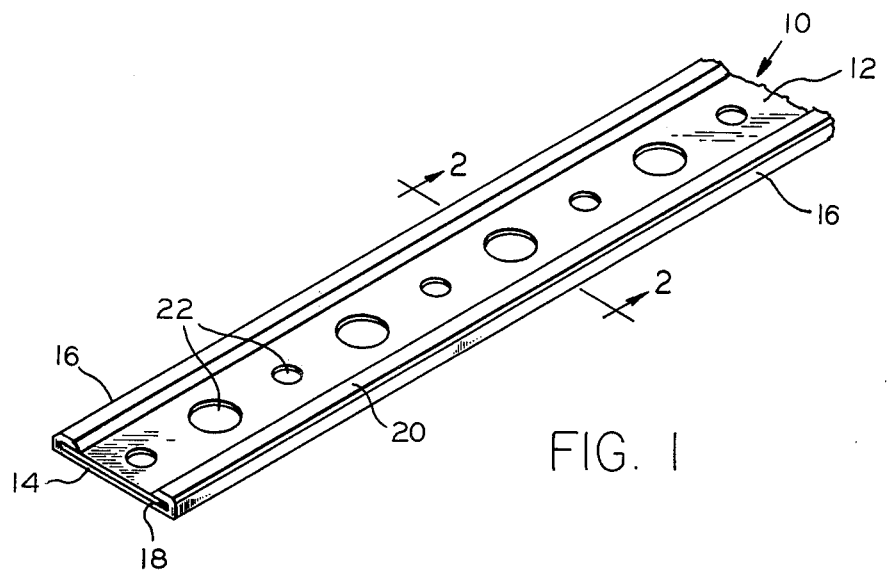
FIG. 1 is perspective view of an insulated hanger strap embodying the invention.

The metal strip 12 is provided with a plurality of spaced apart apertures 22. As illustrated in FIG. 1, the apertures 22 are preferably of different sizes, to permit the attachment of the hanger strap to a supporting structure by means of fasteners, such as nails, screws or bolts for example. Because the elastomeric strip 14 is easily pierced, it need not be provided with corresponding apertures.

The metal strip 12 is of sufficient flexibility that it may be easily deformed to conform to the size and shape of the duct or pipe to be supported. The elastomeric strip 14 is also of sufficient flexibility that when the insulated hanger iron 10 is bent, the flanges 16 flex to retain their surrounding relationship to the edges of the metal strip 12. Polyvinylchloride is a preferred elastomeric material.

Figure 3:
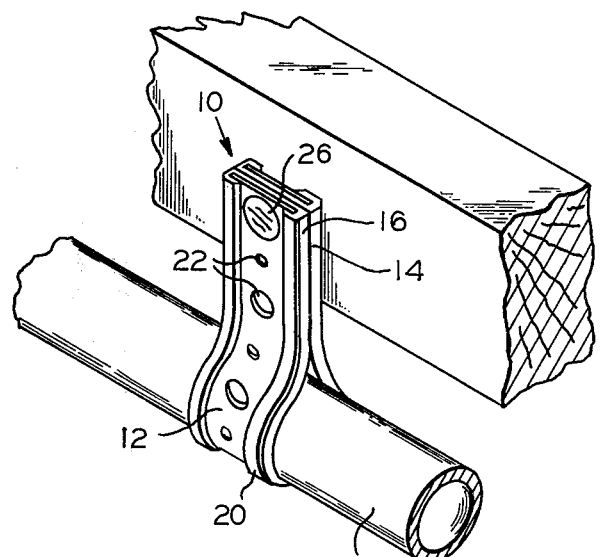
FIG. 3 is a perspective view of a hanger strap embodying this invention attached to a structure and supporting an associated pipe.

In use, the insulated hanger strap 10 is bent around the duct or pipe 24 to be supported, with the side completely covered by insulating strip 14 contacting the pipe 24, as illustrated in FIG. 3. The hanger strap 10 is then attached to a supporting structure by driving suitable fasteners 26 through apertures 22. When so installed, plastic pipe is protected by the insulating strip 14 from the possibility of scoring or gouging by the edges of the metal strip 12. The elastomeric strip 14 also eliminates vibrational noises that would otherwise be caused by the contact of the metal strip 12 and the ductwork or pipe being supported.

In accordance with the provisions of the patent statutes, the principle and mode of operation of the apparatus have been explained and what is considered to represent its best embodiment has been illustrated and described. It should, however, be understood that the invention may be practiced otherwise than as specifically illustrated and described without departing from its spirit or scope.

I claim:

1. A hanger strap for supporting objects comprising an elongate strip of sheet metal of sufficient flexibility to permit said strip to be readily deformed to conform to the contour of an object to be supported; an elongate strip of elastomeric material coterminous with said metal strip, said strip of elastomeric material including upstanding flanges integrally formed on the opposing longitudinal edges thereof, channels formed in said flanges in facing relationship to each other and parallel to the respective longitudinal edges of said strip of elastomeric material, and constructed and arranged to receive the edges of said strip of sheet metal, whereby one side and both edges of said strip of sheet metal are covered by said elastomeric strip; said strip of sheet metal only including a plurality of space apart apertures formed therein, having a plurality of sizes, said strip of elastomeric material being imperforate.

* * * * *